United States Patent [19]

Kozima et al.

[11] 4,319,619
[45] Mar. 16, 1982

[54] RADIAL-PLY TIRE HAVING LOW ROLLING RESISTANCE

[75] Inventors: Masatoshi Kozima, Hiratsuka; Akinori Tokieda, Yokohama; Tadanobu Nagumo, Hiratsuka; Masaru Hirai, Yokohama, all of Japan

[73] Assignee: The Yokohama Rubber Co., Ltd., Tokyo, Japan

[21] Appl. No.: 132,123

[22] Filed: Mar. 20, 1980

[30] Foreign Application Priority Data

Mar. 23, 1979 [JP] Japan .................................. 54-33945

[51] Int. Cl.$^3$ .......................... B60C 1/00; B60C 5/14; B60C 9/02
[52] U.S. Cl. ........................... 152/209 R; 152/330 R; 152/357 R; 152/360; 152/374; 152/DIG. 16;
[58] Field of Search ........... 152/209, 210, 211, 330 R, 152/360, 357 R, 361 R, 361 DM, 374, 349–350, 156/123 R; 128 R; 128 T; 128 N; 152/DIG. 16

[56] References Cited

U.S. PATENT DOCUMENTS 3,157,218 11/1964 Brown .............................. 152/330 R
3,830,275 8/1974 Russell ........................ 152/209 R X
3,871,432 3/1975 Lachut ............................ 152/360 R

FOREIGN PATENT DOCUMENTS 52-118705 10/1977 Japan .

OTHER PUBLICATIONS

Journal of Elastomers and Plastics, "Compositional Variables Affecting Dynamic Properties of Tire CPDS", vol. 9 (Oct. 1977) pp. 384–394.
Journal of Elastomers and Plastics, "Improved Dynamic Properties in Tires", vol. 10 (Oct. 1978), pp. 326–339.

Primary Examiner—Edward C. Kimlin
Assistant Examiner—Lois E. Boland
Attorney, Agent, or Firm—Armstrong, Nikaido, Marmelstein & Kubovcik

[57] ABSTRACT

A pneutmatic radial-ply tire in which the rubber portion of at least one of a carcass ply and an undertread constituting the tire is made of a rubber which has a viscoelastic property of loss tangent, $\tan\delta$, of 0.2 or lower ($\tan\delta \leq 0.2$) and storage modulus, G, of 120 Kg/cm$^2$ or higher (G $\geq$ 120 kg/cm$^2$), so that the rolling resistance of the tire is reduced without being accompanied by degradation of braking performance, control stability, comfortableness and wear resistance of the tire.

2 Claims, 1 Drawing Figure

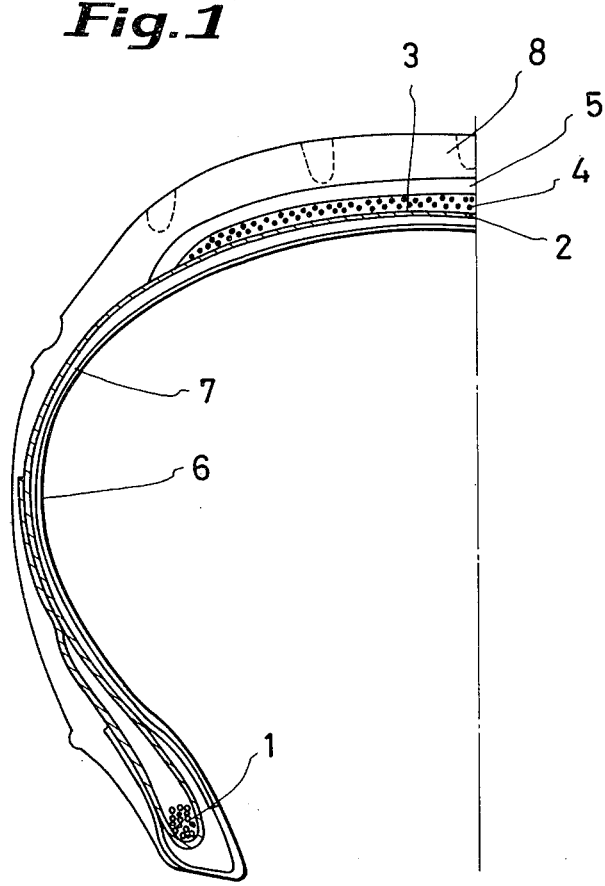

RADIAL-PLY TIRE HAVING LOW ROLLING RESISTANCE

BACKGROUND OF THE INVENTION

The present invention relates to a radial-ply tire and, more particularly, to a pneumatic radial tire in which the loss of energy caused by internal frictions between constituents of the tire caused by a deformation of the tire during running is diminished to reduce the rolling resistance of the tire.

To cope with the current demand for energy saving, various approaches have been made to reduce the rolling resistance of tire to decrease the rate of fuel consumption of automobiles. The rolling resistance of tire can effectively be reduced by diminishing the internal friction loss caused by a deformation of the tire during running. A known measure for diminishing the internal friction loss is to use a rubber having a characteristic of small internal friction loss as the material of the cap tread of the tire.

The level of the internal friction loss of the above mentioned rubber, however, seriously affects general characteristics of the tire such as braking performance, steering performance, comfort, wear-resistant property and so forth. For instance, if a rubber having a small internal friction loss is used to reduce the rolling resistance of the tire during running, various unfavorable phenomena are caused during high-speed cruising or running on a wet road, such as an increase of braking distance, deterioration of the control stability, degraded comfortableness, reduced wear resistance and so on. These are quite undesirable for a tire.

Conventionally, the cap tread of the tire, which occupies the greatest part in volume of the tire, has been constituted by a rubber which inherently has a large internal friction loss, in order to improve the above-mentioned characteristics of the tire. The attempt to reduce the rolling resistance of the tire by diminishing the internal friction loss, therefore, is inevitably accompanied by a certain degradation of the tire characteristics.

SUMMARY OF THE INVENTION

It is, therefore, an object of the invention to provide a pneumatic radial-ply tire having a reduced rolling resistance, thereby to eliminate the above-described problems of the prior art.

To this end, according to the invention, a rubber having a visco-elastic property of small friction loss and high elastic modulus is disposed in at least one of undertread and carcass ply constituting the tire. By so doing, it is possible to remarkably reduce the rolling resistance of the tire during running, without suffering degradation of tire characteristics at high-speed cruising or during running on wet road, such as increase of braking distance, deterioration of the control stability, degradation of comfortableness and reduction of wear resistance.

BRIEF DESCRIPTION OF THE DRAWINGS

The FIGURE is a sectional view of a part of a radial-ply tire constructed in accordance with an embodiment of the invention.

DETAILED DESCRIPTION OF THE INVENTION

A radial-ply tire of the invention is constituted, as shown in the FIGURE, by a cap tread 8 which contacts the road surface, an undertread 5 disposed inside of the cap tread 8, a belt layer 4 inside the undertread 5, a toroidal carcass ply 2 disposed inside the belt layer 4, an outer liner layer 7 and an inner layer 6 which is the innermost layer.

The carcass ply 2 is constituted by a plurality of cords which are arranged at an angle of 70°–90° (or 90°–110°) to the equator plane of the tire, and is retained at its both ends by bead wires 1.

The portion of the carcass ply 2 behind the tread is reinforced by the belt layer 4.

According to the invention, a rubber having a visco-elastic characteristics of loss tangent (tan $\delta$) of 0.2 or lower and storage modulus (G) of 120 kg/cm$^2$ or higher used for either one or both of the rubber coating the carcass ply 2 and the rubber of the undertread 5.

Preferably, a rubber having the above-mentioned visco-elasticity is used as either one or both of the rubbers constituting the inner liner layer 6 and the outer liner layer 7.

The term "loss tangent (tan $\delta$)" is used here to mean the ratio between the loss modulus and storage modulus and is generally represented by "tan $\delta$".

The aforementioned object of the invention is achieved by the use of a rubber having a visco-elasticity of tan $\delta$ of 0.2 or lower and storage modulus (referred to as "G" hereinunder) of 120 kg/cm$^2$ or higher either as the rubber of the undertread 5 or the coating rubber of the carcass ply 2. However, the improvement of visco-elasticities of the inner liner layer 6 and the outer liner layer 7 solely cannot provide any remarkable effect because these liner layers have small thicknesses.

It is therefore preferable that the visco-elasticity of the inner and outer liner layers 6 and 7 is improved besides the improvement in the rubber constituting the undertread 5 or the rubber coating the carcass ply 2.

It is also preferable that the thicknesses of the rubber layers in the carcass ply 2 and the inner liner layer 6 are reduced as much as possible without being accompanied by the degradation of the characteristics of the tire.

With regard to the thickness of the tread, further, it is preferred that within a range not detrimental to the various tire characteristics referred to above, the thickness of the cap tread 8 is reduced as much as possible and that of the undertread 5 is complementarily increased.

The rubber (composition) having the values of tan $\delta$ of 0.2 or lower and G of 120 kg/cm$^2$ or higher, which is suitably used in carrying out the invention, can be produced by the following process.

A vulcanizable rubber is selected from a group consisting of natural rubber (polyisoprene rubber), diene rubber, blend rubbers of natural and diene rubbers at any mixing ratio, and rubbers obtained by blending a diene copolymer rubber with the preceding rubbers at any desired ratio. To 100 weight parts of this rubber, added are 2.50 to 3.60 weight parts of sulfur as the curing agent, 1.00 to 2.00 weight parts of vulcanization accelerator of sulfenamide group and 40 to 65 weight parts of carbon black of particle sizes ranging between 25 and 77 m$\mu$ as the reinforcement. A suitable reinforcement, filler, antioxidant, vulcanization accelerator, softener and the like, which are commonly used as rubber compounding agents, can be added besides the above-mentioned agents if necessary.

If the value for tan δ alone is to be looked upon, it may be operated to make use of a large amount of sulfur and a vulcanization accelerator and incorporate a small amount of carbon black of a large particle size. However, the rubber composition thus prepared involves a difficulty in processability for blending and other processing operations and, if incorporated with the vulcanization accelerator of a large amount in particular and employed for coating carcass cords, it can no longer have a desirable characteristics of adhesion or bonding relative to the carcass cords and/or an adjacent rubber layer and can hardly be put for a practical use.

Taking into account the physical properties such as tearing strength, tensile strength and so forth of the rubber, the compounding ratios of the sulfur and the vulcanization accelerator are 2.50 to 3.50 weight parts and 1.00 to 2.00 weight parts for 100 weight parts of rubber. More preferably, sulfur, vulcanization accelerator and carbon black of particle size ranging between 45 and 77 mμ are added at rates of 2.70–3.20 weight parts, 1.20–1.70 weight parts and 45–60 weight parts, respectively.

Hereinafter, the results of tests conducted with a tire of the invention will be described by way of example.

The value of tan δ of the rubber used in the Examples was measured by a known method which consists in preparing a specimen of rubber having a length, breadth and thickness of 10.0 mm, 9.0 mm and 2.0 mm, respectively attaching the specimen to a spectrometer (manufactured by IWAMOTO SEISAKUSHO), and effecting a shearing vibration at a frequency of 50 Hz and dynamic strain of 5% under a temperature of 40° C.

EXAMPLE 1

Rubbers having compositions shown in Table 1 were prepared and the G value, as well as tan δ, was measured with these rubbers.

Radial-ply tires A-T shown below were produced using the samples Nos. 1 to 7 shown in Table 1. These radial-ply tires were tested to measure the rolling resistances by means of a drum-type testing machine having a diameter of 170.7 cm under a condition of air pressure of 1.9 Kg/cm², load of 420 Kg and speeds of 40, 60 and 80 Km/h. The rolling resistances are shown in Tables 2 to 6, at indexes representing the resistance of tire A by 100.

TABLE 1

| Items | Compositions of rubber used in this invention | | | | | Compositions of reference rubber | |
|---|---|---|---|---|---|---|---|
| | No. 1 | No. 2 | No. 3 | No. 4 | No. 5 | No. 6 | No. 7 |
| natural rubber (polyisoprene rubber inclusive) | 100 | 80 | 55 | 80 | 40 | 80 | 55 |
| cis-1,4-polybutadiene rubber | | | 15 | | 20 | | 15 |
| styrene-butadiene rubber | | 20 | 30 | 20 | 40 | 20 | 30 |
| zinc white | 5 | 5 | 5 | 5 | 5 | 5 | 5 |
| stearic acid | 3 | 3 | 2 | 3 | 2 | 3 | 2 |
| antioxidant RD | 1 | 1 | 1 | 1 | 1 | 1 | 1 |
| aromatic oil | 5 | 5 | 5 | 5 | 5 | 8 | 8 |
| HAF (carbon black) | | 45 | | 40 | 20 | 50 | |
| FEF (carbon black) | | | | | 25 | | |
| GPF (carbon black) | 50 | | 60 | | | | 55 |
| sulfur | 2.8 | 3.0 | 2.8 | 2.5 | 2.7 | 2.5 | 2.5 |
| vulcanization accelerator | 1.7 | 1.2 | 1.5 | 1.0 | 1.0 | 1.0 | 1.2 |
| loss tangent : tan δ | 0.10 | 0.18 | 0.15 | 0.20 | 0.20 | 0.22 | 0.15 |
| storage mudulus : G (kg/cm²) | 135 | 160 | 140 | 120 | 135 | 170 | 118 |

A . . Rubber composition No. 6 is used as the materials of all constituents of the tire, by way of layer.
B . . Rubber composition No. 1 is used for undertread rubber solely.
C . . Rubber composition No. 3 is used for undertread rubber solely.
D . . Rubber composition No. 5 is used for undertread rubber solely.
E . . Rubber composition No. 7 is used for undertread rubber solely.
F . . Rubber composition No. 2 is used for the carcass ply coating rubber solely.
G . . Rubber composition No. 3 is used for the carcass ply coating rubber solely.
H . . Rubber composition No. 4 is used for the carcass ply coating rubber solely.
I . . Rubber composition No. 5 is used for the carcass ply coating rubber solely.
J . . Rubber composition No. 1 is used for both of undertread rubber and carcass ply coating rubber.
K . . Rubber composition No. 2 is used for both of undertread rubber and carcass ply coating rubber.
L . . Rubber composition No. 4 is used for both of undertread rubber and carcass ply coating rubber.
M . . Rubber composition No. 1 is used only for outer liner layer.
N . . Rubber composition No. 4 is used only for inner liner layer.
O . . Rubber composition No. 1 is used for undertread layer, outer liner layer and the inner liner layer.
P . . Rubber composition No. 2 is used for carcass ply coating rubber, outer liner layer and the inner liner layer.
Q . . Rubber composition No. 1 is used for all constituents of the tire.
R . . Rubber composition No. 2 is used for all constituents of the tire.
S . . Rubber composition No. 4 is used for all constituents of the tire.
T . . Rubber composition No. 4 is used only for cap tread rubber.

TABLE 2

Rolling resistance of tires having different compositions of undertread rubber.

| Tire | Speed | | |
|---|---|---|---|
| | 40 km/hr | 60 km/hr | 80 km/hr |
| A | 100 | 100 | 100 |
| B | 93 | 92 | 93 |
| C | 94 | 94 | 95 |
| D | 98 | 99 | 99 |
| E | 99 | 100 | 100 |

TABLE 3

Rolling resistance of tire having different compositions of carcass ply coating rubber

| Tire | Speed | | |
|---|---|---|---|
| | 40 km/hr | 60 kg/hr | 80 kg/hr |
| A | 100 | 100 | 100 |
| F | 97 | 98 | 98 |

TABLE 3-continued

Rolling resistance of tire having different compositions of carcass ply coating rubber

| Tire | Speed | | |
|---|---|---|---|
| | 40 km/hr | 60 kg/hr | 80 kg/hr |
| G | 95 | 95 | 96 |
| H | 99 | 99 | 100 |
| I | 98 | 99 | 100 |

TABLE 4

Rolling resistance of tires having different compositions of undertread rubber and carcass ply coating rubber

| Tire | Speed | | |
|---|---|---|---|
| | 40 km/hr | 60 km/hr | 80 km/hr |
| A | 100 | 100 | 100 |
| J | 88 | 87 | 88 |
| K | 95 | 95 | 96 |
| L | 97 | 97 | 97 |

TABLE 5

Rolling resistances of tires having different compositions of outer liner layer and inner liner layer

| Tire | Speed | | |
|---|---|---|---|
| | 40 km/hr | 60 km/hr | 80 km/hr |
| A | 100 | 100 | 100 |
| M | 99 | 100 | 100 |
| N | 100 | 99 | 100 |
| O | 91 | 91 | 92 |
| P | 96 | 96 | 97 |

TABLE 6

Rolling resistance of tires having different compositions of all constituents

| Tire | Speed | | |
|---|---|---|---|
| | 40 km/hr | 60 km/hr | 80 km/hr |
| A | 100 | 100 | 100 |
| Q | 86 | 86 | 87 |
| R | 92 | 93 | 94 |
| S | 96 | 97 | 96 |
| T | 80 | 80 | 81 |

EXAMPLE 2

In order to confirm that the tire of the invention well meets another requirement, i.e. the preservation of braking performance, tires selected as representative from those shown in Tables 2 to 6 were attached to an automobile for measurement of the breaking distance on a wet road, and the results are shown at Table 7 in which the greater index represents a higher braking performance. Under identical conditions concerning the wet road surface and other, braking distances at 60 km/hr were determined in connection with the automobile mounting the test tire. [This determination was made on the drive test course of Nippon Jidosha Kenkyu-sho (Institute for Development and Research for Automobiles of Japan)]. The indices shown in Table 7 are obtained by putting the breaking distance values found of tires A, B, F, K, P, Q, R and T into the X of:

$$\frac{\text{breaking distance found of tire } A}{X} \times 100.$$

TABLE 7

| Tire | Breaking distance index on wet road | | | | | | | |
|---|---|---|---|---|---|---|---|---|
| | A | B | F | K | P | Q | R | T |
| Index | 100 | 99 | 100 | 100 | 100 | 99 | 100 | 70 |

From the results of the tests heretofore described, it is clearly understood that the tires constructed in accordance with the invention, i.e. tires B,C,D,F,G,H,I,J,K, L,O,P,Q,R and S, exhibit reduced rolling resistances as compared with conventional tires A, E, M, N and T, without being accompanied by substantial deterioration of the braking performance.

It is also to be noted that, according to the invention, the rubber (composition) as used in the tire of the invention makes it possible to obtain a greater G value without substantial degradation of tan $\delta$ as compared with rubber (composition) used in the conventional tires. This means that the wall-thickness of the tire is reduced to permit the reduction of weight of the tire. This in turn contributes to a further reduction of the rolling resistance, in addition to the aforementioned effects. The reduced weight of the tire has a significance also from the viewpoint of energy saving, which, in combination with the energy saving effect afforded by the reduced rolling resistance, well meets the social demand. Thus, the present invention provides a pneumatic radial-ply tire which has superior characteristics and well contributes to the saving of energy thereby to meet the social demand.

What is claimed is:

1. A radial-ply tire having:
   at least one carcass ply consisting of a plurality of cords arranged at an inclination angle of 70° to 90° to the equator plane of the tire, said carcass ply being retained at its both ends by means of bead wires;
   a belt layer for reinforcing the portion of said carcass ply behind the tread, said belt layer being disposed between the tread and the carcass ply;
   an undertread layer disposed at the outside of said belt layer;
   an inner liner layer disposed at the innermost portion of the tire; and
   an outer liner layer disposed adjacent to the outer surface of said inner liner layer;
   wherein the improvement comprises that the rubber portion of at least one of said carcass ply and said undertread has a visco-elastic property of loss tangent, tan $\delta$, of 0.2 or lower (tan $\delta \leq 0.2$) and storage modulus, G, of 120 kg/cm² or higher (G $\geq$ 120 kg/cm²) measured by a shearing vibration at a frequency of 50 Hz and a dynamic strain of 5% under a temperature of 40° C. and is a rubber which is formed by adding 2.50 to 3.50 weight parts of sulfur, 1 to 2 parts of vulcanization accelerator of sulfenamide group and 40 to 65 weight parts of carbon black having a mean particle size of 25 to 77 m$\mu$ to 100 weight parts of at least one vulcanizable rubber which is selected from the group consisting of natural rubber, diene rubber and diene copolymer rubber.

2. A radial-ply tire as claimed in claim 1, wherein the rubber portion of at least one of said inner liner layer and said outer liner layer has a visco-elastic property of loss tangent, tan $\delta$, of 0.2 or lower and storage modulus, G, of 120 kg/cm² or higher measured by a shearing vibration at a frequency of 50 Hz and a dynamic strain of 5% under a temperature of 40° C.

* * * * *